US010110939B1

(12) United States Patent
Wittke

(10) Patent No.: US 10,110,939 B1
(45) Date of Patent: Oct. 23, 2018

(54) SYSTEMS AND METHODS FOR PRESENTING A SERVICE APPLICATION SELECTION WINDOW INCLUDING DYNAMIC ICONS

(71) Applicant: Rovi Guides, Inc., San Carlos, CA (US)

(72) Inventor: David Gerald Wittke, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/494,822

(22) Filed: Apr. 24, 2017

(51) Int. Cl.
```
G06F 3/00        (2006.01)
G06F 13/00       (2006.01)
H04N 5/445       (2011.01)
H04N 21/262      (2011.01)
H04N 21/482      (2011.01)
H04N 21/83       (2011.01)
H04N 21/431      (2011.01)
```

(52) U.S. Cl.
CPC ... *H04N 21/26283* (2013.01); *H04N 21/4312* (2013.01); *H04N 21/4821* (2013.01); *H04N 21/4826* (2013.01); *H04N 21/83* (2013.01)

(58) Field of Classification Search
None
See application file for complete search history.

(56) References Cited

U.S. PATENT DOCUMENTS

| | | | |
|---|---|---|---|
| 9,326,035 B1* | 4/2016 | Thompson | H04N 21/482 |
| 2002/0067376 A1* | 6/2002 | Martin | G06Q 30/02 |
| | | | 715/810 |
| 2006/0039481 A1* | 2/2006 | Shen | H04N 5/45 |
| | | | 375/240.25 |
| 2007/0011702 A1* | 1/2007 | Vaysman | H04N 5/44543 |
| | | | 725/45 |
| 2007/0250865 A1* | 10/2007 | Krakirian | H04N 5/44543 |
| | | | 725/58 |
| 2008/0066103 A1* | 3/2008 | Ellis | H04N 5/44591 |
| | | | 725/38 |
| 2010/0171881 A1* | 7/2010 | Castellan | H04N 5/44543 |
| | | | 348/598 |
| 2011/0283320 A1* | 11/2011 | Levin | H04N 21/466 |
| | | | 725/40 |
| 2012/0079429 A1* | 3/2012 | Stathacopoulos | G06F 17/30979 |
| | | | 715/830 |
| 2012/0204201 A1* | 8/2012 | Cassidy | H04N 21/258 |
| | | | 725/10 |

(Continued)

*Primary Examiner* — William J Kim
(74) *Attorney, Agent, or Firm* — Haley Guiliano LLP

(57) ABSTRACT

Systems and methods are disclosed herein for presenting, a service application including dynamic icons. The systems and methods may generate for display first and second service applications represented by first and second media assets, respectively. The systems and methods may receive a user selection of a service state of the first application and determine, for the first application, one of a first and one of a second plurality of media assets available on the first and second service application, respectively, corresponding to the service state. The systems and methods may replace the first and second media assets with the fourth and fifth media assets respectively, wherein the fourth and fifth media assets correspond to the one of a first and one of a second plurality of media assets, respectively.

20 Claims, 8 Drawing Sheets

(56) References Cited

U.S. PATENT DOCUMENTS

| | | | |
|---|---|---|---|
| 2012/0210358 A1* | 8/2012 | Anthru | H04H 60/65 725/40 |
| 2013/0174195 A1* | 7/2013 | Witenstein-Weaver | H04N 21/4722 725/32 |
| 2013/0332838 A1* | 12/2013 | Naggar | G06Q 30/06 715/733 |
| 2014/0344861 A1 | 11/2014 | Berner et al. | |
| 2015/0074728 A1* | 3/2015 | Chai | H04N 21/482 725/61 |
| 2015/0264420 A1* | 9/2015 | Shriqui | H04N 21/4181 725/31 |
| 2015/0373407 A1* | 12/2015 | Vondersaar | H04N 21/458 725/46 |
| 2016/0249104 A1* | 8/2016 | Chung | H04N 21/47202 |
| 2016/0373804 A1* | 12/2016 | Iyer | G06F 3/0488 |
| 2017/0164058 A1* | 6/2017 | Garcia Navarro | H04N 21/482 |

\* cited by examiner

SYSTEMS AND METHODS FOR PRESENTING A SERVICE APPLICATION SELECTION WINDOW INCLUDING DYNAMIC ICONS

BACKGROUND

In prior art systems, when a user selects an application by tapping on the application icon, the user does not have knowledge of what media assets are available in the selected application. The application icon does not provide any information about the content of the application before it is selected and opened. Thus, searching for a particular media asset can quickly become tiring and frustrating for the user because the user has to open each application and check if the desired content is available in the application.

SUMMARY

Systems and methods are provided herein for presenting, in an interactive program guide, a service application selection window including dynamic icons. For example, a service application selection window can be the display of an APPLE TV, ROKU, GOOGLE CHROMECAST, or a similar set-top or streaming device. APPLE TV is a trademark owned by Apple, Inc., ROKU is a trademark owned by Roku, Inc., and GOOGLE CHROMECAST is a trademark owned by Google, Inc. A media guidance application may display several icons to the user. For example, the media guidance application may display a NETFLIX application icon and an AMAZON VIDEO application icon on the APPLE TV screen. NETFLIX is a trademark owned by Netflix, Inc. and AMAZON VIDEO is a trademark owned by Amazon, Inc. The media guidance application may receive a user selection of a service state for one of the applications. For example, the media guidance application may receive a user's selection of the "Watch List" service state for the NETFLIX application. Examples of service states are "Recently Watched," "Watch List," "Trending," "Genre-X," and the like. The media guidance application may determine one media asset corresponding to a media asset available in the service application. For example, the media guidance application may determine that "The Godfather" and "Happy Gilmore" are the first movies on the Watch List for NETFLIX application and AMAZON VIDEO application, respectively. Further, the media guidance application may replace the logos with still or dynamic frames corresponding to the media assets. For example, the media guidance application may replace the NETFLIX application logo with a still or moving frame from the movie "The Godfather" and the AMAZON VIDEO application logo with a still or moving frame from the "Happy Gilmore" movie.

Systems and methods are provided herein for presenting, in an interactive program guide, a service application selection window including dynamic icons. For example, the media guidance application may present a frame from a movie available in the NETFLIX application, instead of presenting the logo of the NETFLIX application in the NETFLIX application icon. For example, the media guidance application may display a single or multiple frames from the first movie on the watch list in the NETFLIX application. The media guidance application may allow the user to open the first movie on the watch list directly from the display. This feature is great for the user because the user may view selections that she is likely to want to watch and that then may be directly played without having to first open the application.

In some embodiments, the media guidance application may generate for display, in an interactive program guide, a first icon and a second icon, wherein the first icon corresponds to a first service application and the second icon corresponds to a second service application, wherein the first icon is represented by a first media asset and the second icon is represented by a second media asset. For example, the media guidance application may display, on the APPLE TV, a NETFLIX application icon, corresponding to the NETFLIX application, represented by the NETFLIX application logo and an AMAZON VIDEO application icon, corresponding to the AMAZON VIDEO application, represented by the AMAZON VIDEO application logo. The media guidance application may receive a user selection of a service state of the first service application. For example, the media guidance application may receive the user's selection of the "Watch List" service state for the NETFLIX application. The media guidance application may determine, for the first service application, one of a first plurality of media assets available on the first service application corresponding to the service state. For example, the media guidance application may determine that the movie "The Godfather" is the first movie on the watch list for NETFLIX application.

In some embodiments, the media guidance application may determine, for the one of the first plurality of media assets available on the first service application corresponding to the service state, a third media asset corresponding to the one of the first plurality of media assets available on the first service application corresponding to the service state. For example, the media guidance application may determine that a still or moving frame from "The Godfather" corresponds to the movie "The Godfather." The media guidance application may retrieve a set of characteristics corresponding to the second service application. For example, the media guidance application may retrieve a set of characteristics of the AMAZON VIDEO application. The media guidance application may determine a set of service states based on the set of characteristics corresponding to the second service application. For example, the media guidance application may determine that the AMAZON VIDEO application only supports the "Recently Watched" service state.

In some embodiments, the media guidance application may determine whether the set of service states includes the service state. For example, the media guidance application may determine that the "Watch List" service state, selected by the user for the NETFLIX application, is available in the AMAZON VIDEO application. In response to determining that the set of service states includes the service state, the media guidance application may determine, for the second service application, one of a second plurality of media assets available on the second service application corresponding to the service state. For example, the media guidance application may determine that the movie "Happy Gilmore" is first on the watch list for the AMAZON VIDEO application. The media guidance application may determine, for the one of the second plurality of media assets available on the second service application corresponding to the service state, a fourth media asset corresponding to the one of the second plurality of media assets available on the second service application corresponding to the service state. For example, the media guidance application may determine that a still or moving frame from "Happy Gilmore" corresponds to the movie "Happy Gilmore."

In some embodiments, the media guidance application may generate a fifth media asset based on the third media asset. For example, the media guidance application may generate the new logo for the NETFLIX application to be a still or moving frame from "The Godfather." The media guidance application may generate a sixth media asset based on the fourth media asset. For example, the media guidance application may generate the new logo for the AMAZON VIDEO application to be a still or moving frame from "Happy Gilmore." The media guidance application may replace the first media asset with the fifth media asset and the second media asset with the sixth media asset. For example, the media guidance application may replace the NETFLIX application logo with a still or moving frame from "The Godfather" and replace the AMAZON VIDEO application logo with a still or moving frame from "Happy Gilmore."

In some embodiments, when receiving the user selection of the service state of the first service application, the media guidance application may display a selectable set of service states. For example, the media guidance application may display the "Recently Watched," "Watch List," "Trending," and "Genre-X" service states for the NETFLIX application. The media guidance application may retrieve a first set of characteristics corresponding to the first service application. For example, the media guidance application may retrieve the set of characteristics corresponding to the NETFLIX application. The media guidance application may determine a first set of service states based on the first set of characteristics corresponding to the first service application. For example, the media guidance application may determine that the NETFLIX application has "Recently Watched," "Watch List," "Trending," and "Genre-X" service states. The media guidance application may determine a common service state, wherein the first set of services includes the common service state and the set of services includes the common service state. For example, the media guidance application may determine the "Watch List" as the common service state because that is the only service state available for the AMAZON VIDEO application. The media guidance application may recommend, to the user, the common service state. For example, the media guidance application may recommend that the user selects the "Watch List" service state.

In some embodiments, when determining, for the one of the first plurality of media assets available on the first service application corresponding to the service state, the third media asset corresponding to the one of the first plurality of media assets available on the first service application corresponding to the service state, the media guidance application may retrieve a frame for the one of the first plurality of media assets available on the first service application corresponding to the service state. For example, the media guidance application may retrieve a frame from "The Godfather" for the NETFLIX application. The media guidance application may determine the third media asset to be the frame for the one of the first plurality of media assets available on the first service application corresponding to the service state. For example, the media guidance application may use the frame from "The Godfather" to represent "The Godfather."

In some embodiments, when determining, for the one of the first plurality of media assets available on the first service application corresponding to the service state, the third media asset corresponding to the one of the first plurality of media assets available on the first service application corresponding to the service state, the media guidance application may retrieve a preview time corresponding to the service state. For example, the media guidance application may retrieve a preview time of 3 seconds for the "Watch List" service state. The media guidance application may retrieve a segment for the one of the first plurality of media assets available on the first service application corresponding to the service state, wherein the segment is of the preview time length. For example, the media guidance application may retrieve a 3 second segment of "The Godfather." The media guidance application may determine the third media asset to be the segment for the one of the first plurality of media assets available on the first service application corresponding to the service state. For example, the media guidance application may use the 3 second segment as the substitute for the NETFLIX application logo.

In some embodiments, when determining a set of service states based on the set of characteristics corresponding to the second service application, the media guidance application may determine, based on the set of characteristics, that the user is a first user of the second service application. For example, the media guidance application may determine the user of the AMAZON VIDEO application based on the login credentials. The media guidance application may retrieve, based on the set of characteristics, a first user viewing profile corresponding to the first user of the second service application. For example, the media guidance application may retrieve the user profile for the user. The media guidance application may retrieve, from the first user viewing profile, a plurality of media assets corresponding to the first user. For example, the media guidance application may retrieve the movies "Happy Gilmore" and "Moana" for the user. The media guidance application may determine, based on the plurality of media assets corresponding to the first user, a set of service states. For example, the media guidance application may determine that the AMAZON VIDEO application has the "Watch List" service state based on the movies "Happy Gilmore" and "Moana."

In some embodiments, in response to determining that the set of service states does not include the service state, the media guidance application may determine a second service state, wherein the second service state was previously selected by the user. For example, the media guidance application may determine that the AMAZON VIDEO application does not have a "Watch List" service state but has the "Recently Watched" service state that the user previously selected. The media guidance application may determine that the set of service states includes the second service state. For example, the media guidance application may determine that the AMAZON VIDEO application has the "Recently Watched." The media guidance application may determine, for the one of the second plurality of media assets available on the second service application corresponding to the second service state, a fifth media asset corresponding to the one of the second plurality of media assets available on the second service application corresponding to the second service state. For example, the media guidance application may determine that "Happy Gilmore" was recently watched through the AMAZON VIDEO application and determine that a still or moving frame from the "Happy Gilmore" movie corresponds to the movie "Happy Gilmore." The media guidance application may generate a fifth media asset based on the first media asset and on the third media asset. The media guidance application may generate a sixth media asset based on the second media asset and on the fourth media asset. The media guidance application may replace the first media asset with the fifth media asset and the second media asset with the sixth media asset.

Further, in some embodiments, the media guidance application may retrieve a name corresponding to the second service state. For example, the media guidance application may retrieve the name of the service state for the AMAZON VIDEO application to be "Recently Watched." The media guidance application may generate the sixth media asset based on the name corresponding to the second service state and the fourth media asset. For example, the media guidance application may generate the new logo used to replace the AMAZON VIDEO application logo to be a still or moving frame from the "Happy Gilmore" movie overlaid by a "Recently Watched" inscription.

In some embodiments, when generating the fifth media asset based on the third media asset, the media guidance application may generate the fifth media asset based on the first media asset and the third media asset. For example, the media guidance application may create a new logo having the boundaries of the NETFLIX application with a still or moving frame from "The Godfather" in the center.

In some embodiments, when generating the fifth media asset based on the third media asset, the media guidance application may determine, for the first service application, another of a first plurality of media assets available on the first service application corresponding to the service state. For example, the media guidance application may determine that the movie "Zootopia" is second on the watch list. The media guidance application may determine, for the another of the first plurality of media assets available on the first service application corresponding to the service state, a seventh media asset corresponding to the another of the first plurality of media assets available on the first service application corresponding to the service state. For example, the media guidance application may determine that a still or moving frame from "Zootopia" corresponds to the movie "Zootopia." The media guidance application may generate the fifth media asset based on the third media asset and the seventh media asset. For example, the media guidance application may generate the new logo to be a combination of still or moving frames from "The Godfather" and "Zootopia."

In some embodiments, when generating the fifth media asset based on the third media asset, the media guidance application may retrieve a name corresponding to the service state. The media guidance application may generate the fifth media asset based on the name corresponding to the service state and the third media asset.

In some embodiments, when generating the fifth media asset based on the third media asset, the media guidance application may retrieve a first name corresponding to the one of the first plurality of media assets. For example, the media guidance application may retrieve the name of the movie "The Godfather." The media guidance application may generate the fifth media asset based on the first name corresponding to the one of the first plurality of media assets and the third media asset. For example, the media guidance application may generate the new logo to be a still or moving frame from "The Godfather" overlaid with an inscription reading "The Godfather."

The conventional approach to this problem is for the user to open each application separately and check if the desired media asset is available in the application. The systems and methods disclosed herein provide a solution that allows the user to see that the desired media asset is available in the application without opening the application. This solution is achieved by a media guidance application that may replace the application logo with a media asset corresponding to the desired media asset. The proposed solution is different from the conventional approach because the proposed solution allows the user to see that the desired media asset is available through an application without opening the application. While the conventional approach forces the user to open the application and only then allows the user to see if a desired media asset is available through the opened application.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
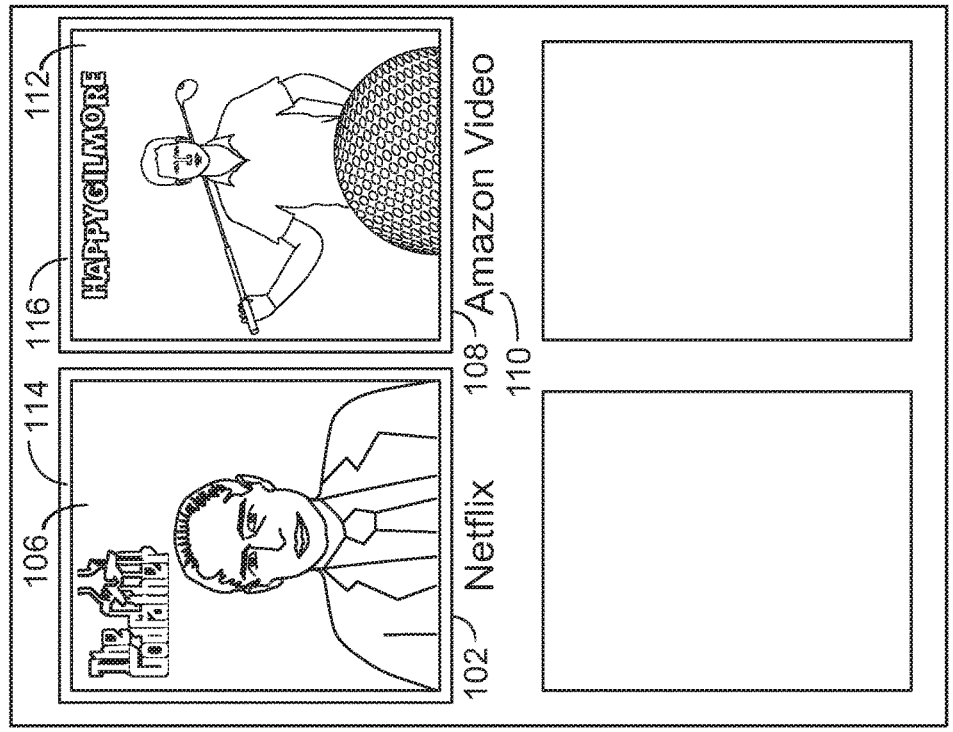
FIG. 1A depicts an illustrative embodiment of user equipment with a display that includes a first and second media assets replaced with fifth and sixth media assets, respectively, in accordance with some embodiments of the disclosure.

FIG. 1A depicts an illustrative embodiment of user equipment with a display that includes a first and second media assets replaced with fifth and sixth media assets, respectively, in accordance with some embodiments of the disclosure. As illustrated, FIG. 1A includes first icon 102, first service application 104, third media asset 106, second icon 108, second service application 110, and fourth media asset 112.

Figure 1B:
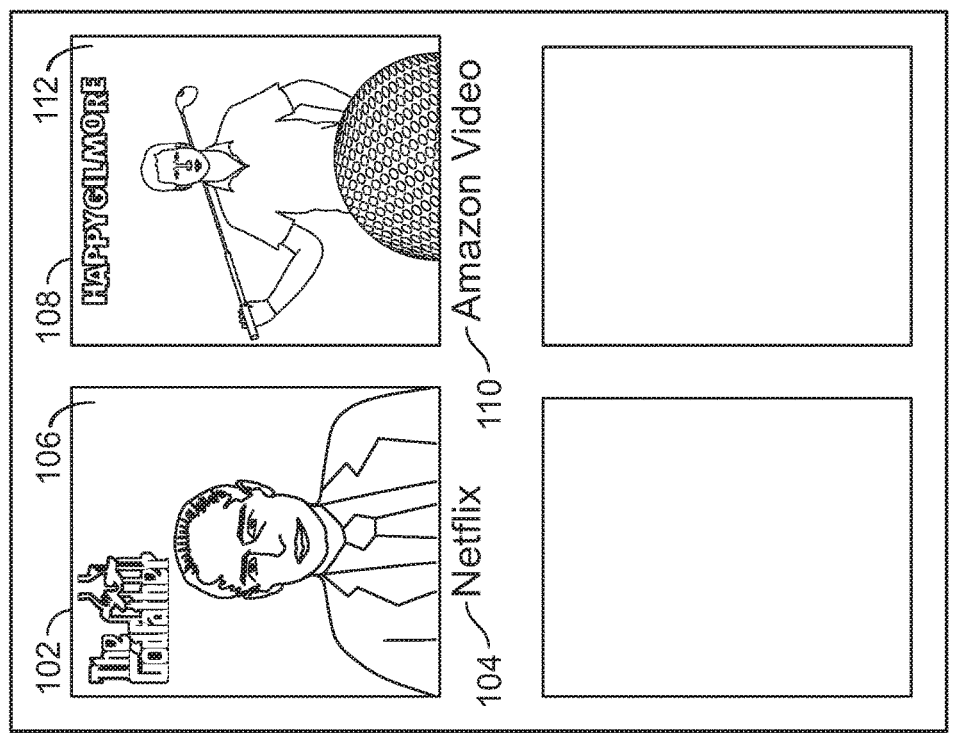
FIG. 1B depicts an illustrative embodiment of user equipment with a display that includes a first and second media assets replaced with fifth and sixth media assets, respectively, wherein the fifth and sixth media assets were generated partially based on the first and second media assets, respectively, in accordance with some embodiments of the disclosure.

FIG. 1B depicts an illustrative embodiment of user equipment with a display that includes a first and second media assets replaced with fifth and sixth media assets, respectively, wherein the fifth and sixth media assets were generated partially based on the first and second media assets, respectively, in accordance with some embodiments of the disclosure. As illustrated, FIG. 1B includes first icon 102, first service application 104, third media asset 106, second icon 108, second service application 110, fourth media asset 112, first media asset 114, and second media asset 116.

Figure 1C:
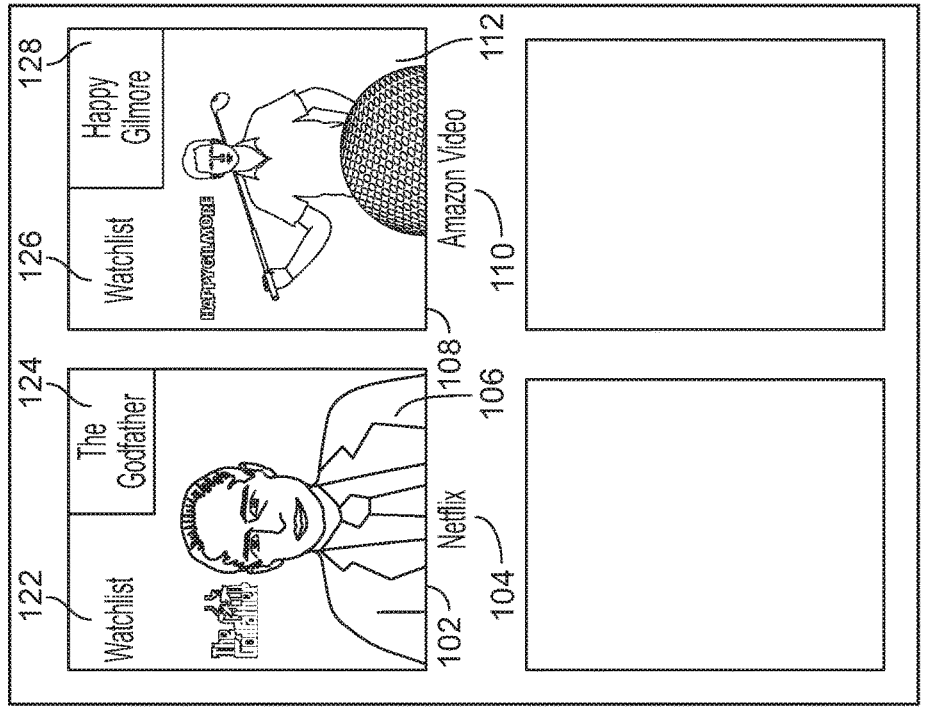
FIG. 1C depicts an illustrative embodiment of user equipment with a display that includes a first and second media assets replaced with fifth and sixth media assets, respectively, wherein the fifth media asset was generated partially based on the seventh media asset.

FIG. 1C depicts an illustrative embodiment of user equipment with a display that includes a first and second media assets replaced with fifth and sixth media assets, respectively, wherein the fifth media asset was generated partially based on the seventh media asset. As illustrated, FIG. 1C includes first icon 102, first service application 104, third media asset 106, second icon 108, second service application 110, fourth media asset 112, seventh media asset 118, and eighth media asset 120.

Figure 1D:
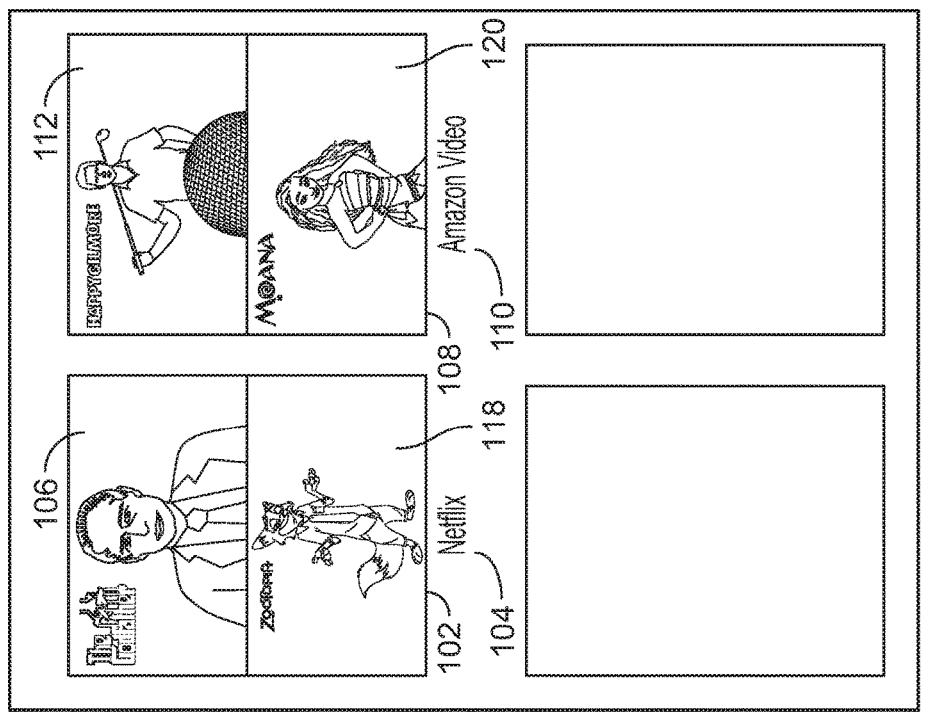
FIG. 1D depicts an illustrative embodiment of user equipment with a display that includes a first and second media assets replaced with fifth and sixth media assets, respectively, wherein the fifth media asset was generated partially based on the name corresponding to the service state.

FIG. 1D depicts an illustrative embodiment of user equipment with a display that includes a first and second media assets replaced with fifth and sixth media assets, respectively, wherein the fifth media asset was generated partially based on the name corresponding to the service state. As illustrated, FIG. 1D includes first icon 102, first service application 104, third media asset 106, second icon 108, second service application 110, fourth media asset 112, first service state name 122, first name 124 corresponding to one of the first plurality of media assets, second service state name 126, and second name corresponding to one of the second plurality of media assets 128.

Systems and methods are provided herein for presenting, in an interactive program guide, a service application selection window including dynamic icons. For example, the media guidance application may replace the logo of the NETFLIX application in the NETFLIX application icon with a still or moving frame from a movie available in the NETFLIX application. For example, the media guidance application may display a single or multiple frames from the first movie on the watch list in the NETFLIX application. The media guidance application may allow the user to open the first movie on the watch list directly from the display. This feature is great for the user because the user may view selections that she is likely to want to watch and that then may be directly played without having to first open the application.

In some embodiments, a media guidance application may display several icons to the user. For example, the media guidance application may display a NETFLIX application icon and an AMAZON VIDEO application icon on the APPLE TV screen. The media guidance application may receive a user selection of a service state for one of the applications. For example, the media guidance application may receive a user's selection of the "Watch List" service state for the NETFLIX application. Examples of service states are "Recently Watched," "Watch List," "Trending," "Genre-X," and the like. The media guidance application may determine, for each application, a still or moving frame corresponding to a media asset to be displayed instead of a logo representing that application. For example, the media guidance application may determine that "The Godfather" and "Happy Gilmore" are the first movies on the Watch List for NETFLIX application and AMAZON VIDEO application, respectively. Further, the media guidance application may replace the logos with a still or moving frame corresponding to the media assets. For example, the media guidance application may replace the NETFLIX application logo with a still or moving frame for "The Godfather" and the AMAZON VIDEO application logo with a still or moving frame from the "Happy Gilmore" movie.

In some embodiments, the media guidance application may generate for display, in an interactive program guide, a first icon 102 and a second icon 108, wherein the first icon 102 corresponds to a first service application 104 and the second icon 108 corresponds to a second service application 110, wherein the first icon 102 is represented by a first media asset 114 and the second icon 108 is represented by a second media asset 116. For example, the media guidance application may display on an APPLE TV, ROKU, GOOGLE CHROMECAST, or the like, a NETFLIX application icon, represented by the NETFLIX application logo and an AMAZON VIDEO application icon, represented by the AMAZON VIDEO application logo. The media guidance application may use display 412 to generate for display the first icon 102 and the second icon 108. The media guidance application may receive a user selection of a service state of the first service application. For example, the media guidance application may receive the user's selection of the "Watch List" service state for the NETFLIX application. The media guidance application may use user input interface 410 to receive user selection. The media guidance application may determine, for the first service application, one of a first plurality of media assets available on the first service application 104 corresponding to the service state. For example, the media guidance application may determine that the movie "The Godfather" is the first movie on the watch list for NETFLIX application.

As used herein, the term "service state" means a category including a listing of media assets, wherein all the media assets, in the listing, share a common characteristic. Examples of service states are "Recently Watched," "Watch List," "Trending," "Genre-X," and the like.

In some embodiments, the media guidance application may determine, for the one of the first plurality of media assets available on the first service application 104 corresponding to the service state, a third media asset 106 corresponding to the one of the first plurality of media assets available on the first service application 104 corresponding to the service state. For example, the media guidance application may determine that a still or moving frame from "The Godfather" corresponds to the movie "The Godfather." The media guidance application may retrieve the third media asset 106 from storage 408. The media guidance application may retrieve a set of characteristics corresponding to the second service application 110. For example, the media guidance application may retrieve a set of characteristics of the AMAZON VIDEO application. The media guidance application may retrieve the set of characteristics from storage 408. The media guidance application may determine a set of service states based on the set of characteristics corresponding to the second service application 110. For example, the media guidance application may determine that the AMAZON VIDEO application has only the "Recently Watched" service state.

In some embodiments, the media guidance application may determine whether the set of service states includes the service state. For example, the media guidance application may determine that the "Watch List" service state, selected by the user for the NETFLIX application, is available in the AMAZON VIDEO application. In response to determining that the set of service states includes the service state, the media guidance application may determine, for the second service application 110, one of a second plurality of media assets available on the second service application 110 corresponding to the service state. For example, the media guidance application may determine that the movie "Happy Gilmore" is the first on the watch list for the AMAZON VIDEO application. The media guidance application may determine, for the one of the second plurality of media assets available on the second service application 110 corresponding to the service state, a fourth media asset 112 corresponding to the one of the second plurality of media assets available on the second service application 110 corresponding to the service state. For example, the media guidance application may determine that a still or moving frame from "Happy Gilmore" corresponds to the movie "Happy Gilmore."

In some embodiments, the media guidance application may generate a fifth media asset based on the third media asset 106. For example, media guidance application may generate the new logo for the NETFLIX application to be a still or moving frame from "The Godfather." The media guidance application may generate a sixth media asset based on the fourth media asset 112. For example, the media guidance application may generate the new logo for the AMAZON VIDEO application to be a still or moving frame from "Happy Gilmore." The media guidance application may replace the first media asset 114 with the fifth media asset and the second media asset 116 with the sixth media asset. For example, the media guidance application may replace the NETFLIX application logo with a still or moving frame from "The Godfather" and replace the AMAZON VIDEO logo with a still or moving frame from "Happy Gilmore."

In some embodiments, when receiving the user selection of the service state of the first service application, the media guidance application may display a selectable set of service states. For example, the media guidance application may display the "Recently Watched," "Watch List," "Trending," and "Genre-X" service states for the NETFLIX application. The media guidance application may use display 412 to display the selection. The media guidance application may retrieve a first set of characteristics corresponding to the first service application. For example, the media guidance application may retrieve the set of characteristics corresponding to the NETFLIX application. The media guidance application may query storage 408 for the set of characteristics in response to the user selection.

The set of characteristics may include a set of service states, a set of media assets, a set of metadata corresponding to the media assets, a set of users, a set of user viewing profiles, a set of viewing histories, a set of login information, and the like.

The media guidance application may determine a first set of service states based on the first set of characteristics corresponding to the first service application. For example, the media guidance application may determine that the NETFLIX application has "Recently Watched," "Watch List," "Trending," and "Genre-X" service states. The media guidance application may determine a common service state, wherein the first set of services includes the common service state and the set of services includes the common service state. For example, the media guidance application may determine the "Watch List" as the common service state because that is the only service state available for the AMAZON VIDEO application. The media guidance application may recommend, to the user, the common service state. For example, the media guidance application may recommend that the user selects the "Watch List" service state. The media guidance application may generate the recommendation for display using display 412.

In some embodiments, when determining, for the one of the first plurality of media assets available on the first service application 104 corresponding to the service state, the third media asset 106 corresponding to the one of the first plurality of media assets available on the first service application 104 corresponding to the service state, the media guidance application may retrieve a frame for the one of the first plurality of media assets available on the first service application 104 corresponding to the service state. For example, the media guidance application may retrieve a frame from "The Godfather" for the NETFLIX application. The media guidance application may retrieve the frame from storage 408. The media guidance application may retrieve the frame from the beginning, ending, or middle of the one of the first plurality of media assets. The media guidance application may determine the third media asset 106 to be the frame for the one of the first plurality of media assets available on the first service application 104 corresponding to the service state. For example, the media guidance application may use a still or moving frame from "The Godfather" to represent "The Godfather" movie.

In some embodiments, when determining, for the one of the first plurality of media assets available on the first service application 104 corresponding to the service state, the third media asset 106 corresponding to the one of the first plurality of media assets available on the first service application 104 corresponding to the service state, the media guidance application may retrieve a preview time corresponding to the service state. For example, the media guidance application may retrieve a preview time of 3 seconds for the "Watch List" service state. The media guidance application may retrieve the preview time from storage 408. The media guidance application may retrieve a segment for the one of the first plurality of media assets available on the first service application 104 corresponding to the service state, wherein the segment is of the preview time length. For example, the media guidance application may retrieve a 3 second segment of "The Godfather." The media guidance application may retrieve a segment composed of subsequent frames or of frames from throughout the one of the first plurality of media assets. The media guidance application may determine the third media asset 106 to be the segment for the one of the first plurality of media assets available on the first service application 104 corresponding to the service state. For example, the media guidance application may use the 3 second segment as the substitute for the NETFLIX application logo.

In some embodiments, when determining a set of service states based on the set of characteristics corresponding to the second service application 110, the media guidance application may determine, based on the set of characteristics, that the user is a first user of the second service application 110. For example, the media guidance application may determine the user of the AMAZON VIDEO application based on the login credentials. The media guidance application may retrieve, based on the set of characteristics, a first user viewing profile corresponding to the first user of the second service application 110. For example, the media guidance application may retrieve the user profile for the user. The media guidance application may retrieve the first user viewing profile from storage 408. The media guidance application may retrieve, from the first user viewing profile, a plurality of media assets corresponding to the first user. For example, the media guidance application may retrieve the movies "Happy Gilmore" and "Moana" for the user. The media guidance application may determine, based on the plurality of media assets corresponding to the first user, a set of service states. For example, the media guidance application may determine that the AMAZON VIDEO application has the "Watch List" service state based on the movies "Happy Gilmore" and "Moana."

In some embodiments, in response to determining that the set of service states does not include the service state, the media guidance application may determine a second service state, wherein the second service state was previously selected by the user. For example, the media guidance application may determine that the AMAZON VIDEO application does not have a "Watch List" service state but has the "Recently Watched" service state and that the user previously selected this state. The media guidance application may retrieve a list of previously selected service states from storage 408. The media guidance application may determine that the set of service states includes the second service state. For example, the media guidance application may determine that the AMAZON VIDEO has the "Recently Watched." The media guidance application may determine, for the one of the second plurality of media assets available on the second service application 110 corresponding to the second service state, a fifth media asset corresponding to the one of the second plurality of media assets available on the second service application 110 corresponding to the second service state. For example, the media guidance application may determine that "Happy Gilmore" was recently watched through the AMAZON VIDEO application and determine that a still or moving frame from the "Happy Gilmore" corresponds to the movie "Happy Gilmore." The media guidance application may generate a fifth media asset based on the first media asset 114 and on the third media asset 106. The media guidance application may generate a sixth media asset based on the second media asset 116 and on the fourth media asset 112. The media guidance application may replace the first media asset 114 with the fifth media asset and the second media asset 116 with the sixth media asset.

Further, in some embodiments, the media guidance application may retrieve a name 122 corresponding to the second service state. For example, the media guidance application may retrieve the name 122 of the service state for the AMAZON VIDEO application to be "Recently Watched." The media guidance application may retrieve the name 122 from storage 408. The media guidance application may generate the sixth media asset based on the name 122 corresponding to the second service state and the fourth media asset 112. For example, the media guidance application may generate the new logo used to replace the AMAZON VIDEO application logo to be a still or moving frame from the "Happy Gilmore" movie overlaid by a "Recently Watched" inscription. The inscription may be permanently, periodically or temporally present. The inscription may be moving.

In some embodiments, when generating the fifth media asset based on the third media asset, the media guidance application may generate the fifth media asset based on the first media asset 114 and the third media asset. For example, the media guidance application may create a new logo having the boundaries of the NETFLIX application with a still or moving frame from "The Godfather" in the center.

In some embodiments, when generating the fifth media asset based on the third media asset 106, the media guidance application may determine, for the first service application, another of a first plurality of media assets available on the first service application 104 corresponding to the service state. For example, the media guidance application may determine that the movie "Zootopia" is second on the watch list. The media guidance application may determine, for the another of the first plurality of media assets available on the first service application 104 corresponding to the service state, a seventh media asset 118 corresponding to the another of the first plurality of media assets available on the first service application 104 corresponding to the service state. For example, the media guidance application may determine that a still or moving frame from "Zootopia" corresponds to the movie "Zootopia." The media guidance application may generate the fifth media asset based on the third media asset 106 and the seventh media asset 118. For example, the media guidance application may generate the new logo to be a combination of still or moving frames from "The Godfather" and "Zootopia." The media guidance application may generate for display the third media asset 106 and the seventh media asset 118 in the same time or alternate between each other. The media guidance application may adjust the duration of how long the third media asset 106 is displayed for, relative to the seventh media asset 118, depending on the user preferences or rating of the corresponding media assets.

In some embodiments, when generating the fifth media asset based on the third media asset 106, the media guidance application may retrieve a name 124 corresponding to the service state. The media guidance application may generate the fifth media asset based on the name 124 corresponding to the service state and the third media asset 106.

In some embodiments, when generating the fifth media asset based on the third media asset 106, the media guidance application may retrieve a first name 124 corresponding to the one of the first plurality of media assets. For example, the media guidance application may retrieve the name 124 of the movie "The Godfather." The media guidance application may retrieve the name 124 from storage 408. The media guidance application may generate the fifth media asset based on the first name 124 corresponding to the one of the first plurality of media assets and the third media asset 106. For example, the media guidance application may generate the new logo to be a still or moving frame from "The Godfather" overlaid by an inscription reading "The Godfather." The inscription may be permanently, periodically or temporally present. The inscription may be moving.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

In some embodiments, the media guidance application may embed a set of GPS data into an audio file for a music track. Further, the media guidance application may use the set of GPS data to create a playlist that is geographically relevant, personalized to the user, on-the-move, and/or pre-prepared playlist. The media guidance application may set the playlist to be aware of the user's location, the user's route, and the user's listening history. The media guidance application may include global geographical data and/or local geographical data in the set of GPS data. Examples of global geographical data are location where the media asset was recorded, locations mentioned in the media asset, locations where the media asset was performed, and the like. Examples of local geographical data are locations where the user first consumed the media asset, and the like. The media guidance application may include various options for customizing the playlist. Examples of options are location-specific options, era-specific options, genre-specific options, knowledge-specific options, and the like. Location-specific options allow the user to select the radius when providing recommendations, and the like. Era-specific options allow the user to select the year, decade associated with the media asset, and the like. Genre-specific options allow the user to select the genre of the media asset (e.g., jazz, rock, blues), and the like. Knowledge-specific options allow the user to select media assets known to the user, media assets unknown to the user, and the like.

In some embodiments, the media guidance application may create and stream a personalized playlist, based on location data and personal listening history, with no effort on the part of the user, while the user is walking through a particular location.

In some embodiments, the media guidance application may allow the user to select a location ahead of a trip to a particular location. The media guidance application may create a playlist specific to the selected location and take into consideration the user's preferences.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
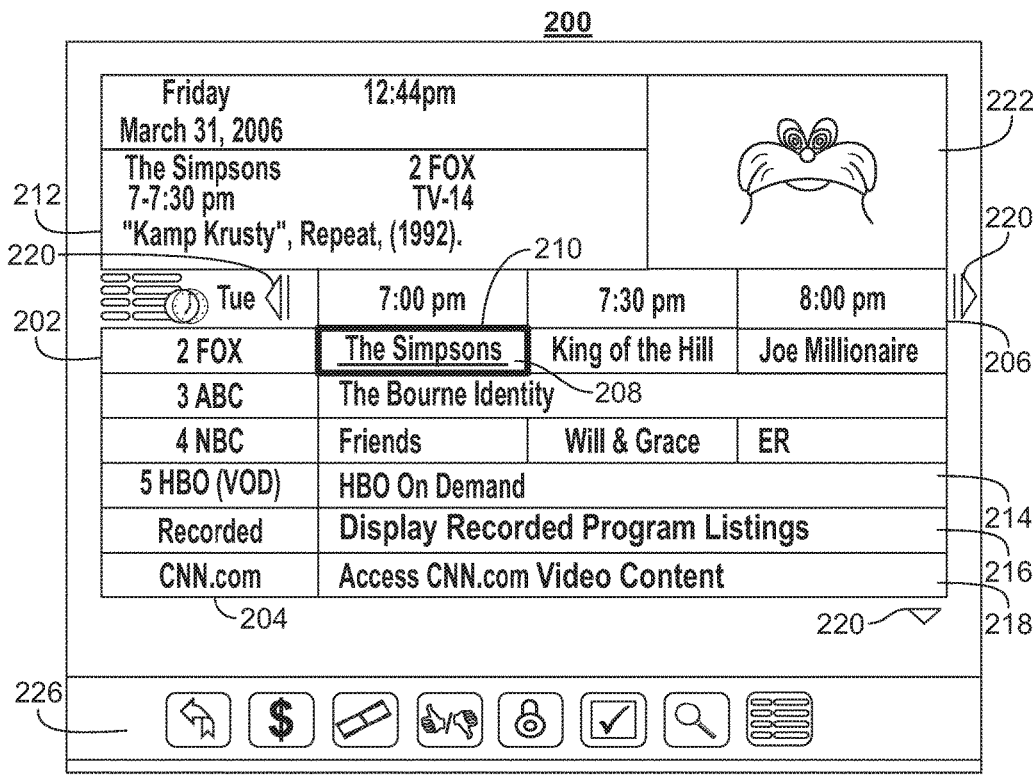
FIG. 2 shows an illustrative embodiment of a display screen that may be used to provide media guidance application listings and other media guidance information by determining if the second service application has the service state, in accordance with some embodiments of the disclosure.
Figure 3:
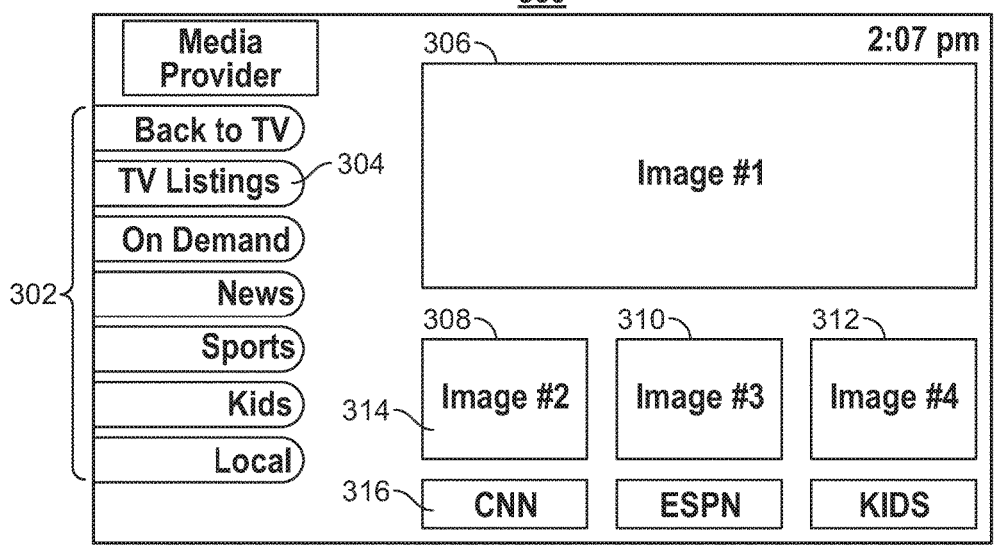
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 216, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay 202, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
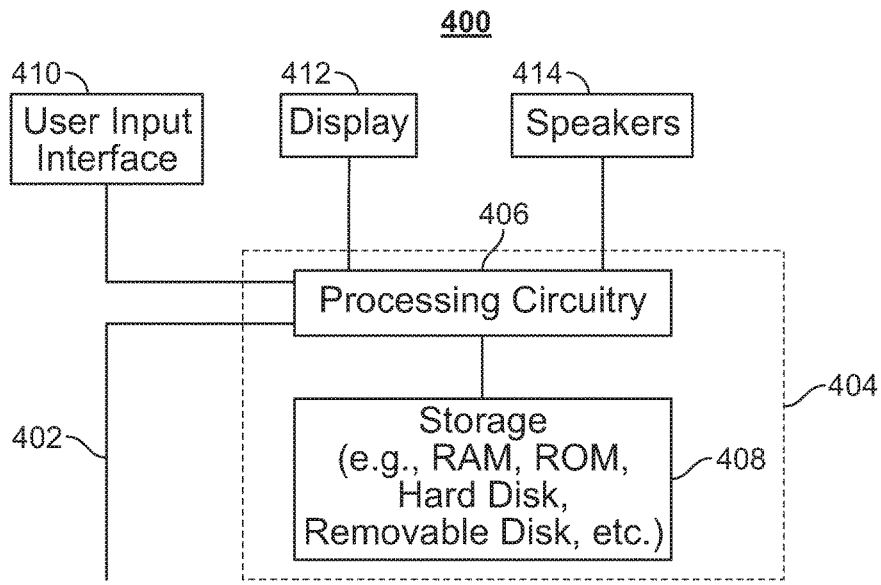
FIG. 4 is a block diagram of an illustrative user equipment (UE) device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Control circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
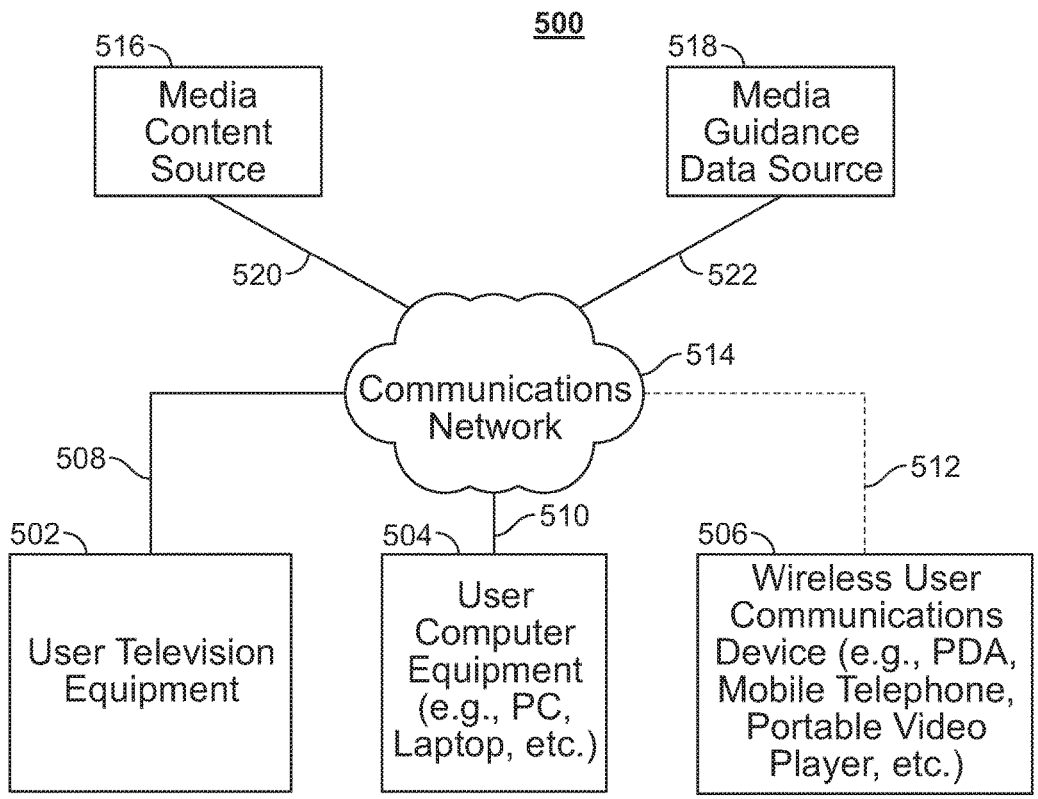
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YOUTUBE is a trademark owned by Google Inc., NETFLIX is a trademark owned by NETFLIX Inc., and HULU is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
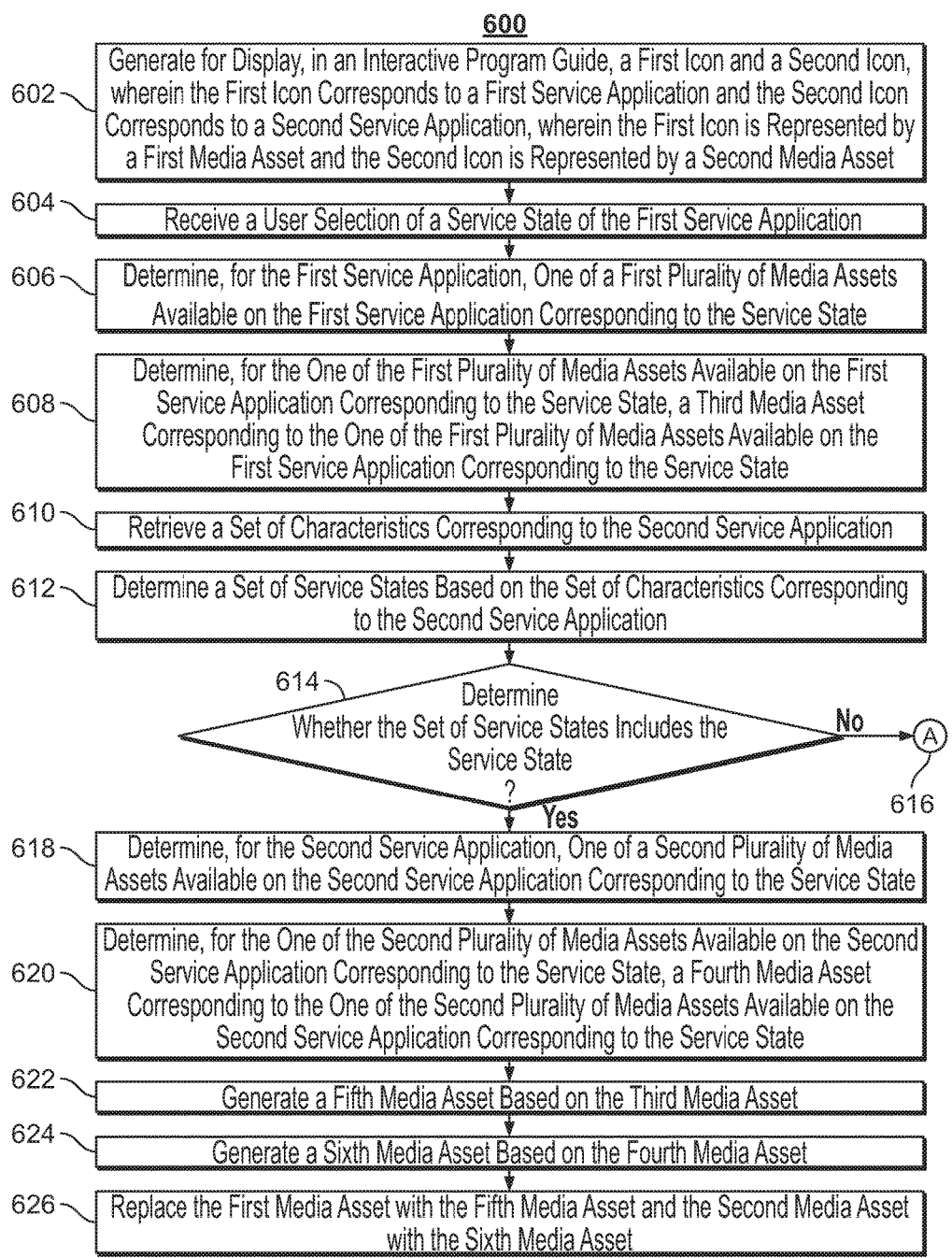
FIG. 6 depicts an illustrative flowchart of a process for presenting, in an interactive program guide, a service application selection window including dynamic icons, in accordance with some embodiments of the disclosure.

FIG. 6 depicts an illustrative flowchart of a process for presenting, in an interactive program guide, a service application selection window including dynamic icons, in accordance with some embodiments of the disclosure. Process 600 may be executed by control circuitry 404 (e.g., in a manner instructed to control circuitry 404 by the media guidance application). Control circuitry 404 may be part of a remote server separated from the user equipment by way of communications network 514.

Process 600 starts at step 602 when control circuitry 404 generates for display, in an interactive program guide, a first icon 102 and a second icon 108, wherein the first icon 102 corresponds to a first service application 104 and the second icon 108 corresponds to a second service application 110, wherein the first icon 102 is represented by a first media asset 114 and the second icon 108 is represented by a second media asset 116. Display 412 may be used to generate for display the first icon 102 and second icon 108. The manner in which control circuitry 404 generates the interactive program guide for display is described above with respect to FIGS. 1A through 1D, and such description is equally applicable to 602.

At step 604 control circuitry 404 receives a user selection of a service state of the first service application. User input interface 410 may be used to receive the user selection. The manner in which control circuitry 404 receives the user selection is described above with respect to FIGS. 1A through 1D, and such description is equally applicable to 604.

At step 606 control circuitry 404 determines, for the first service application, one of a first plurality of media assets available on the first service application 104 corresponding to the service state. The manner in which control circuitry 404 determines one of the first plurality of media assets is described above with respect to FIGS. 1A through 1D, and such description is equally applicable to 606.

At step 608 control circuitry 404 determines, for the one of the first plurality of media assets available on the first service application 104 corresponding to the service state, a third media asset 106 corresponding to the one of the first plurality of media assets available on the first service application 104 corresponding to the service state. The manner in which control circuitry 404 determines, for the one of the first plurality of media assets available on the first service application 104 corresponding to the service state, a third media asset 106 corresponding to the one of the first plurality of media assets available on the first service application 104 corresponding to the service state is described above with respect to FIGS. 1A through 1D, and such description is equally applicable to 608.

At step 610 control circuitry 404 retrieves a set of characteristics corresponding to the second service application 110. Control circuitry 404 may retrieve the set of characteristics from storage 408. The manner in which control circuitry 404 retrieves the set of characteristics is described above with respect to FIGS. 1A through 1D, and such description is equally applicable to 610.

At step 612 control circuitry 404 determines a set of service states based on the set of characteristics corresponding to the second service application 110. The manner in which control circuitry 404 determines a set of service states is described above with respect to FIGS. 1A through 1D, and such description is equally applicable to 612.

At step 614 control circuitry 404 determines whether the set of service states includes the service state. The manner in which control circuitry 404 determines whether the set of service states includes the service state is described above with respect to FIGS. 1A through 1D, and such description is equally applicable to 614.

If at step 614 control circuitry 404 determines that the set of service states does not include the service state, process 600 may optionally continue to step 702 of process 700.

If at step 614 control circuitry 404 determines that the set of service states includes the service state, process 600 continues to step 618. At step 618, control circuitry 404 determines, for the second service application 110, one of a second plurality of media assets available on the second service application 110 corresponding to the service state. The manner in which control circuitry 404 determines one of the second plurality of media assets is described above with respect to FIGS. 1A through 1D, and such description is equally applicable to 618.

At step 620 control circuitry 404 determines, for the one of the second plurality of media assets available on the second service application 110 corresponding to the service state, a fourth media asset 112 corresponding to the one of the second plurality of media assets available on the second service application 110 corresponding to the service state. The manner in which control circuitry 404 determines fourth media asset 112 is described above with respect to FIGS. 1A through 1D, and such description is equally applicable to 620.

At step 622 control circuitry 404 generates a fifth media asset based on the third media asset 106. The manner in which control circuitry 404 generates a fifth media asset based on the third media asset 106 is described above with respect to FIGS. 1A through 1D, and such description is equally applicable to 622.

At step 624 control circuitry 404 generates a sixth media asset based on the fourth media asset 112. The manner in which control circuitry 404 generates a sixth media asset based on the fourth media asset 112 is described above with respect to FIGS. 1A through 1D, and such description is equally applicable to 624.

At step 626 control circuitry 404 replaces the first media asset 114 with the fifth media asset and the second media asset 116 with the sixth media asset. The manner in which control circuitry 404 replaces the first media asset 114 with the fifth media asset and the second media asset 116 with the sixth media asset is described above with respect to FIGS. 1A through 1D, and such description is equally applicable to 626.

Figure 7:
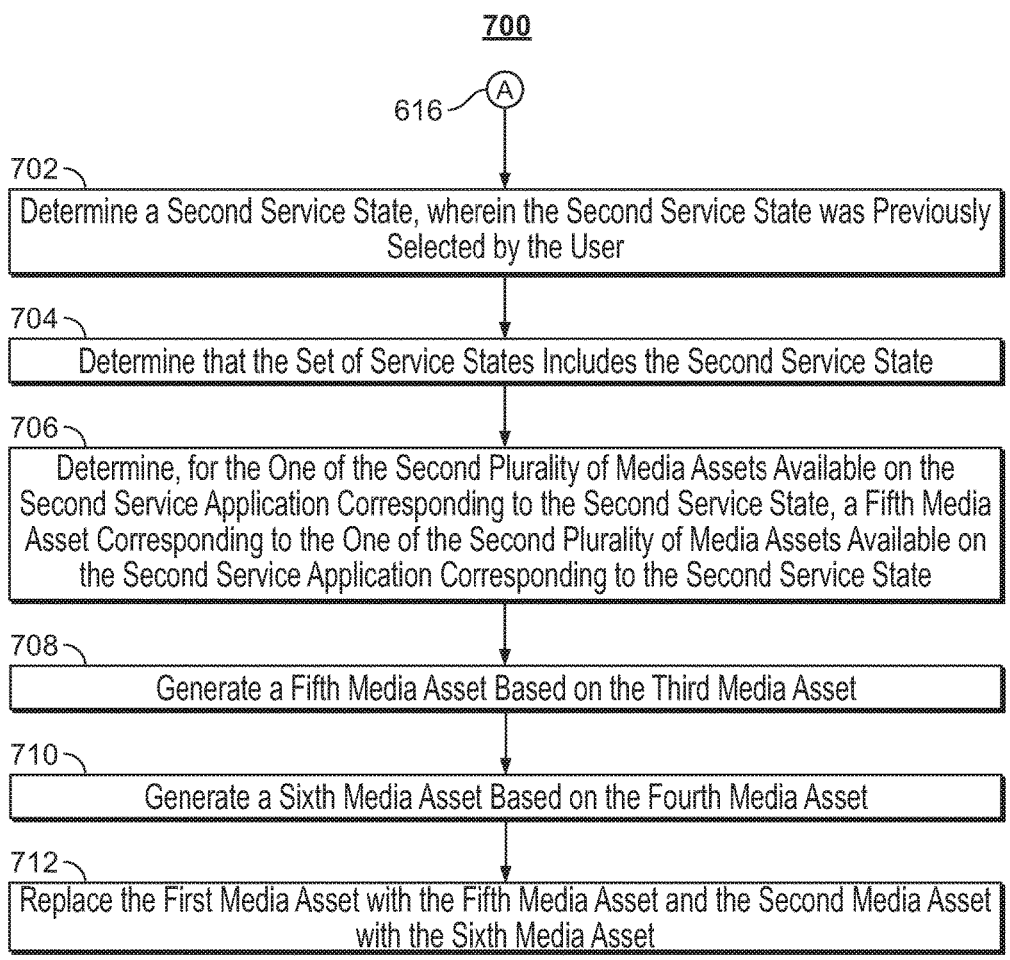
FIG. 7 depicts an illustrative flowchart of a process for determining the second service state previously selected by the user, in accordance with some embodiments of the disclosure.

FIG. 7 depicts an illustrative flowchart of a process for determining the second service state previously selected by the user, in accordance with some embodiments of the disclosure. Process 700 may be executed by control circuitry 404 (e.g., in a manner instructed to control circuitry 404 by the media guidance application). Control circuitry 404 may be part of remote server separated from the user equipment by way of communications network 514.

Process 700 starts at step 702, when control circuitry 404 determines a second service state, wherein the second service state was previously selected by the user. The manner in which control circuitry 404 determines a second service state is described above with respect to FIGS. 1A through 1D, and such description is equally applicable to 702.

At step 704 control circuitry 404 determines that the set of service states includes the second service state. The manner in which control circuitry 404 determines that the set of service states includes the second service state is described above with respect to FIGS. 1A through 1D, and such description is equally applicable to 704.

At step 706 control circuitry 404 determines, for the one of the second plurality of media assets available on the second service application 110 corresponding to the second service state, a fifth media asset corresponding to the one of the second plurality of media assets available on the second service application 110 corresponding to the second service state. The manner in which control circuitry 404, a fifth media asset corresponding to the one of the second plurality of media assets available on the second service application 110 corresponding to the second service state, is described above with respect to FIGS. 1A through 1D, and such description is equally applicable to 706.

At step 708 control circuitry 404 generates a fifth media asset based on the first media asset 114 and on the third media asset 106. The manner in which control circuitry 404 generates a fifth media asset based on the first media asset 114 and on the third media asset 106 is described above with respect to FIGS. 1A through 1D, and such description is equally applicable to 708.

At step 710 control circuitry 404 generates a sixth media asset based on the second media asset 116 and on the fourth media asset 112. The manner in which control circuitry 404 generates a sixth media asset based on the second media asset 116 and on the fourth media asset 112 is described above with respect to FIGS. 1A through 1D, and such description is equally applicable to 710.

At step 712 control circuitry 404 replaces the first media asset 114 with the fifth media asset and the second media asset 116 with the sixth media asset. The manner in which control circuitry 404 replaces the first media asset 114 with the fifth media asset and the second media asset 116 with the sixth media asset is described above with respect to FIGS. 1A through 1D, and such description is equally applicable to 712.

Figure 8:
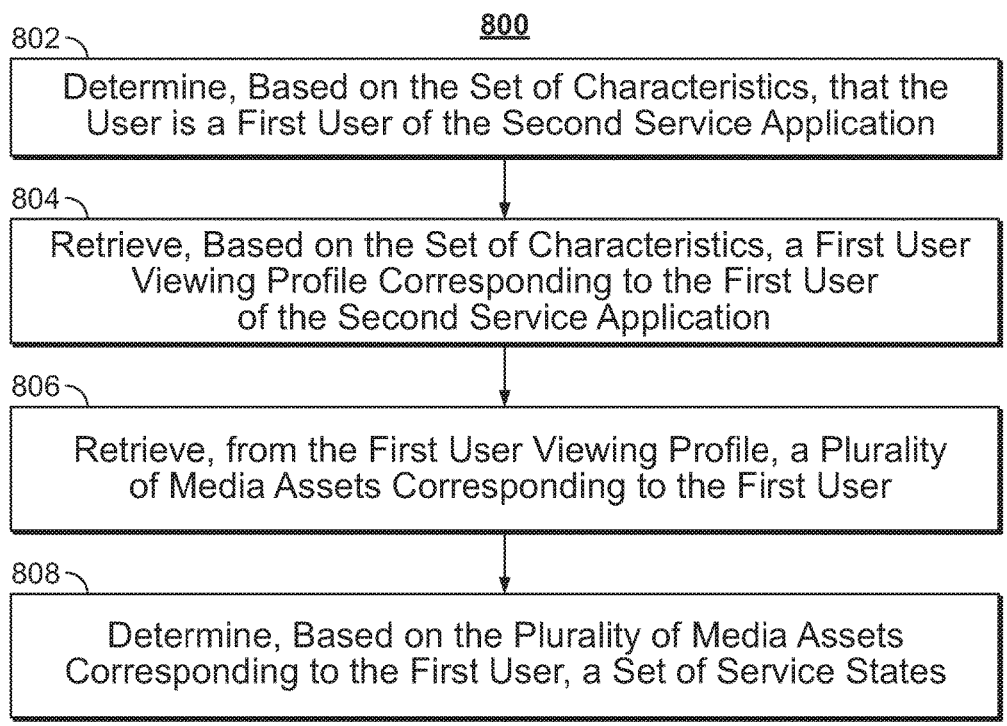
FIG. 8 depicts an illustrative flowchart of a process for determining a set of service states based on the set of characteristics corresponding to the second service application, in accordance with some embodiments of the disclosure.

FIG. 8 depicts an illustrative flowchart of a process for determining a set of service states based on the set of characteristics corresponding to the second service application 110, in accordance with some embodiments of the disclosure. Process 800 may be executed by control circuitry 404 (e.g., in a manner instructed to control circuitry 404 by the media guidance application). Control circuitry 404 may be part of a remote server separated from the user equipment by way of communications network 514.

Process 800 starts at step 802 when control circuitry 404 determines, based on the set of characteristics, that the user is a first user of the second service application 110. The manner in which control circuitry 404 determines, based on the set of characteristics, that the user is a first user of the second service application 110 is described above with respect to FIGS. 1A through 1D, and such description is equally applicable to 802.

At step 804 control circuitry 404 retrieves, based on the set of characteristics, a first user viewing profile corresponding to the first user of the second service application 110. The manner in which control circuitry 404 retrieves, based on the set of characteristics, a first user viewing profile corresponding to the first user of the second service application 110 is described above with respect to FIGS. 1A through 1D, and such description is equally applicable to 804.

At step 806 control circuitry 404 retrieves, from the first user viewing profile, a plurality of media assets corresponding to the first user. The manner in which control circuitry 404 retrieves, from the first user viewing profile, a plurality of media assets corresponding to the first user is described above with respect to FIGS. 1A through 1D, and such description is equally applicable to 806.

At step 808 control circuitry 404 determines, based on the plurality of media assets corresponding to the first user, a set of service states. The manner in which control circuitry 404 determines, based on the plurality of media assets corresponding to the first user, a set of service states is described above with respect to FIGS. 1A through 1D, and such description is equally applicable to 808.

Figure 9:
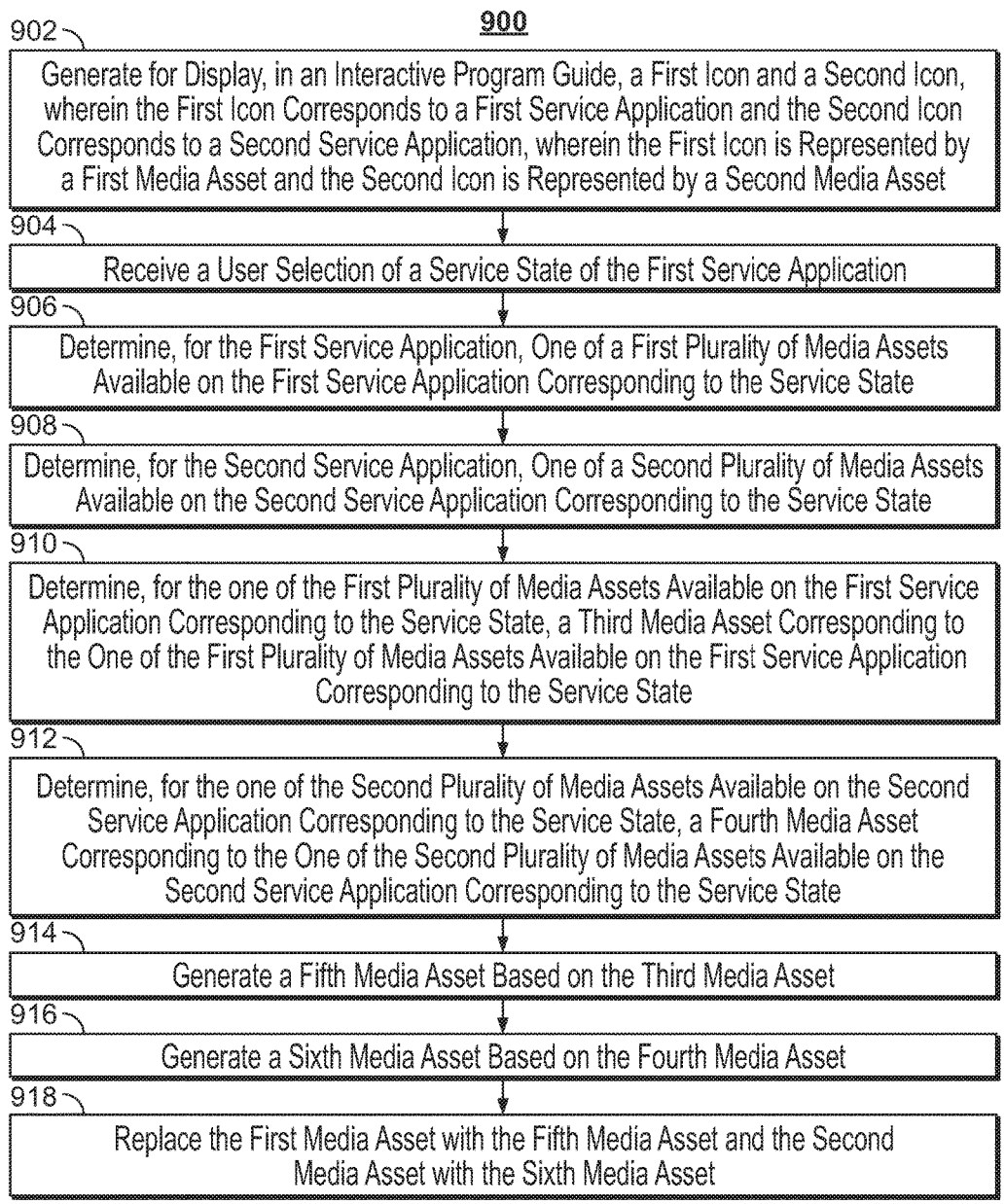
FIG. 9 depicts an illustrative flowchart of a process for presenting, in an interactive program guide, a service application selection window including dynamic icons, in accordance with some embodiments of the disclosure.

FIG. 9 depicts an illustrative flowchart of a process for presenting, in an interactive program guide, a service application selection window including dynamic icons, in accordance with some embodiments of the disclosure. Process 900 may be executed by control circuitry 404 (e.g., in a manner instructed to control circuitry 404 by the media guidance application). Control circuitry 404 may be part of remote server separated from the user equipment by way of communications network 514.

Process 900 starts at step 902 when control circuitry 404 generates for display, in an interactive program guide, a first icon 102 and a second icon 108, wherein the first icon 102 corresponds to a first service application 104 and the second icon 108 corresponds to a second service application 110, wherein the first icon 102 is represented by a first media asset 114 and the second icon 108 is represented by a second media asset 116. Display 412 may be used to generate for display the first icon 102 and the second icon 108. The manner in which control circuitry 404 generates for display, in an interactive program guide, a first icon 102 and a second icon 108, wherein the first icon 102 corresponds to a first service application 104 and the second icon 108 corresponds to a second service application 110, wherein the first icon 102 is represented by a first media asset 114 and the second icon 108 is represented by a second media asset 116, is described above with respect to FIGS. 1A through 1D, and such description is equally applicable to 902.

At step 904 control circuitry 404 receives a user selection of a service state of the first service application. Control circuitry 404 may use user input interface 410 to receive the user selection. The manner in which control circuitry 404 receives a user selection of a service state of the first service application is described above with respect to FIGS. 1A through 1D, and such description is equally applicable to 904.

At step 906 control circuitry 404 determines, for the first service application, one of a first plurality of media assets available on the first service application 104 corresponding to the service state. The manner in which control circuitry 404 determines, for the first service application, one of a first plurality of media assets available on the first service application 104 corresponding to the service state is described above with respect to FIGS. 1A through 1D, and such description is equally applicable to 906.

At step 908 control circuitry 404 determines, for the second service application 110, one of a second plurality of media assets available on the second service application 110 corresponding to the service state. The manner in which control circuitry 404 determines, for the second service application 110, one of a second plurality of media assets available on the second service application 110 corresponding to the service state is described above with respect to FIGS. 1A through 1D, and such description is equally applicable to 908.

At step 910 control circuitry 404 determines, for the one of the first plurality of media assets available on the first service application 104 corresponding to the service state, a third media asset 106 corresponding to the one of the first plurality of media assets available on the first service application 104 corresponding to the service state. The manner in which control circuitry 404 determines, for the one of the first plurality of media assets available on the first service application 104 corresponding to the service state, a third media asset 106 corresponding to the one of the first plurality of media assets available on the first service application 104 corresponding to the service state is described above with respect to FIGS. 1A through 1D, and such description is equally applicable to 910.

At step 912 control circuitry 404 determines, for the one of the second plurality of media assets available on the second service application 110 corresponding to the service state, a fourth media asset 112 corresponding to the one of the second plurality of media assets available on the second service application 110 corresponding to the service state. The manner in which control circuitry 404 determines, for the one of the second plurality of media assets available on the second service application 110 corresponding to the service state, a fourth media asset 112 corresponding to the one of the second plurality of media assets available on the second service application 110 corresponding to the service state is described above with respect to FIGS. 1A through 1D, and such description is equally applicable to 912.

At step 914 control circuitry 404 generates a fifth media asset based on the third media asset 106. The manner in which control circuitry 404 generates a fifth media asset based on the third media asset 106 is described above with respect to FIGS. 1A through 1D, and such description is equally applicable to 914.

At step 916 control circuitry 404 generates a sixth media asset based on the fourth media asset 112. The manner in which control circuitry 404 generates a sixth media asset based on the fourth media asset 112 is described above with respect to FIGS. 1A through 1D, and such description is equally applicable to 916.

At step 918 control circuitry 404 replaces the first media asset 114 with the fifth media asset and the second media asset 116 with the sixth media asset. The manner in which control circuitry 404 replaces the first media asset 114 with the fifth media asset and the second media asset 116 with the sixth media asset is described above with respect to FIGS. 1A through 1D, and such description is equally applicable to 918.

It should be noted that processes 600-900 or any step thereof could be performed on, or provided by, any of the devices shown in FIGS. 2-5. For example, any of processes 600-900 may be executed by control circuitry 404 (FIG. 4) as instructed by control circuitry implemented on user equipment 502, 504, 506 (FIG. 5), and/or a user equipment for selecting a recommendation. In addition, one or more steps of processes 600-900 may be incorporated into or combined with one or more steps of any other process or embodiment.

It is contemplated that the steps or descriptions of each of FIGS. 6-9 may be used with any other embodiment of this disclosure. In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-5 could be used to perform one or more of the steps in FIGS. 6-9.

It will be apparent to those of ordinary skill in the art that the methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. The processing circuitry, for instance, may be a general purpose processor, a customized integrated circuit (e.g., an ASIC), or a field-programmable gate array (FPGA) within user equipment 400, media content source 516, or media guidance data source 518. For example, a profile, as described herein, may be stored in, and retrieved from, storage 408 of FIG. 4, or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for presenting, in an interactive program guide, a service application selection window including dynamic icons, the method comprising:
generating for display, in an interactive program guide, a first icon and a second icon, wherein the first icon corresponds to a first service application and the second icon corresponds to a second service application, wherein the first icon is represented by a first media asset and the second icon is represented by a second media asset;
receiving a user selection of a service state of the first service application;

determining, for the first service application, one of a first plurality of media assets available on the first service application corresponding to the service state of the first service application;

determining, for the one of the first plurality of media assets available on the first service application corresponding to the service state of the first service application, a third media asset corresponding to the one of the first plurality of media assets available on the first service application corresponding to the service state of the first service application;

retrieving a set of characteristics corresponding to the second service application;

determining a set of service states based on the set of characteristics corresponding to the second service application;

determining whether the set of service states includes the service state of the first service application; and in response to determining that the set of service states includes the service state of the first service application:

determining, for the second service application, one of a second plurality of media assets available on the second service application corresponding to the service state of the first service application;

determining, for the one of the second plurality of media assets available on the second service application corresponding to the service state of the first service application, a fourth media asset corresponding to the one of the second plurality of media assets available on the second service application corresponding to the service state of the first service application;

generating a fifth media asset based on the third media asset;

generating a sixth media asset based on the fourth media asset; and replacing the first media asset with the fifth media asset and the second media asset with the sixth media asset.

2. The method of claim 1 wherein receiving the user selection of the service state of the first service application comprises:

displaying a selectable set of service states;

retrieving a first set of characteristics corresponding to the first service application;

determining a first set of service states based on the first set of characteristics corresponding to the first service application;

determining a common service state, wherein the first service application includes the common service state and the selectable set of service states includes the common service state; and recommending, to the user, the common service state.

3. The method of claim 1 wherein determining, for the one of the first plurality of media assets available on the first service application corresponding to the service state of the first service application, the third media asset corresponding to the one of the first plurality of media assets available on the first service application corresponding to the service state of the first service application comprises:

retrieving a frame for the one of the first plurality of media assets available on the first service application corresponding to the service state of the first service application; and determining the third media asset to be the frame for the one of the first plurality of media assets available on the first service application corresponding to the service state of the first service application.

4. The method of claim 1 wherein determining, for the one of the first plurality of media assets available on the first service application corresponding to the service state of the first service application, the third media asset corresponding to the one of the first plurality of media assets available on the first service application corresponding to the service state of the first service application comprises:

retrieving a preview time corresponding to the service state of the first service application;

retrieving a segment for the one of the first plurality of media assets available on the first service application corresponding to the service state of the first service application, wherein the segment is of the preview time length; and determining the third media asset to be the segment for the one of the first plurality of media assets available on the first service application corresponding to the service state of the first service application.

5. The method of claim 1 comprising:

in response to determining that the set of service states does not include the service state of the first service application:

determining a second service state, wherein the second service state was previously selected by the user;

determining that the set of service states includes the second service state;

determining, for the one of the second plurality of media assets available on the second service application corresponding to the second service state, the fifth media asset corresponding to the one of the second plurality of media assets available on the second service application corresponding to the second service state; and generating the fifth media asset based on the first media asset and on the third media asset;

generating the sixth media asset based on the second media asset and on the fourth media asset; and replacing the first media asset with the fifth media asset and the second media asset with the sixth media asset.

6. The method of claim 5 wherein generating the sixth media asset based on the fourth media asset comprises:

retrieving a name corresponding to the second service state; and generating the sixth media asset based on the name corresponding to the second service state and the fourth media asset.

7. The method of claim 1 wherein generating the fifth media asset based on the third media asset comprises:

generating the fifth media asset based on the first media asset and the third media asset.

8. The method of claim 1 wherein generating the fifth media asset based on the third media asset comprises:

determining, for the first service application, another of a first plurality of media assets available on the first service application corresponding to the service state of the first service application;

determining, for the another of the first plurality of media assets available on the first service application corresponding to the service state of the first service application, a seventh media asset corresponding to the another of the first plurality of media assets available on the first service application corresponding to the service state of the first service application; and generating the fifth media asset based on the third media asset and the seventh media asset.

9. The method of claim 1 wherein generating the fifth media asset based on the third media asset comprises:
retrieving a name corresponding to the service state of the first service application; and
generating the fifth media asset based on the name corresponding to the service state of the first service application and the third media asset.

10. The method of claim 1 wherein generating the fifth media asset based on the third media asset comprises:
retrieving a first name corresponding to the one of the first plurality of media assets; and
generating the fifth media asset based on the first name corresponding to the one of the first plurality of media assets and the third media asset.

11. A system for presenting, in an interactive program guide, a service application selection window including dynamic icons, the system comprising:
control circuitry configured to:
generate for display, in an interactive program guide, a first icon and a second icon, wherein the first icon corresponds to a first service application and the second icon corresponds to a second service application, wherein the first icon is represented by a first media asset and the second icon is represented by a second media asset;
receive a user selection of a service state of the first service application;
determine, for the first service application, one of a first plurality of media assets available on the first service application corresponding to the service state of the first service application;
determine, for the one of the first plurality of media assets available on the first service application corresponding to the service state of the first service application, a third media asset corresponding to the one of the first plurality of media assets available on the first service application corresponding to the service state of the first service application;
retrieve a set of characteristics corresponding to the second service application;
determine a set of service states based on the set of characteristics corresponding to the second service application;
determine whether the set of service states includes the service state of the first service application; and
in response to determining that the set of service states includes the service state of the first service application:
determine, for the second service application, one of a second plurality of media assets available on the second service application corresponding to the service state of the first service application;
determine, for the one of the second plurality of media assets available on the second service application corresponding to the service state of the first service application, a fourth media asset corresponding to the one of the second plurality of media assets available on the second service application corresponding to the service state of the first service application;
generate a fifth media asset based on the third media asset;
generate a sixth media asset based on the fourth media asset; and replace the first media asset with the fifth media asset and the second media asset with the sixth media asset.

12. The system of claim 11 wherein the control circuitry is further configured, when receiving the user selection of the service state of the first service application, to:
display a selectable set of service states;
retrieve a first set of characteristics corresponding to the first service application;
determine a first set of service states based on the first set of characteristics corresponding to the first service application;
determine a common service state, wherein the first service application includes the common service state and the selectable set of service states includes the common service state; and
recommend, to the user, the common service state.

13. The system of claim 11 wherein the control circuitry is further configured, when determining, for the one of the first plurality of media assets available on the first service application corresponding to the service state of the first service application, the third media asset corresponding to the one of the first plurality of media assets available on the first service application corresponding to the service state of the first service application, to:
retrieve a frame for the one of the first plurality of media assets available on the first service application corresponding to the service state of the first service application; and
determine the third media asset to be the frame for the one of the first plurality of media assets available on the first service application corresponding to the service state of the first service application.

14. The system of claim 11 wherein the control circuitry is further configured, when determining, for the one of the first plurality of media assets available on the first service application corresponding to the service state of the first service application, the third media asset corresponding to the one of the first plurality of media assets available on the first service application corresponding to the service state of the first service application, to:
retrieve a preview time corresponding to the service state of the first service application;
retrieve a segment for the one of the first plurality of media assets available on the first service application corresponding to the service state of the first service application, wherein the segment is of the preview time length; and
determine the third media asset to be the segment for the one of the first plurality of media assets available on the first service application corresponding to the service state of the first service application.

15. The system of claim 11 wherein the control circuitry is further configured to:
in response to determining that the set of service states does not include the service state of the first service application:
determine a second service state, wherein the second service state was previously selected by the user;
determine that the set of service states includes the second service state;
determine, for the one of the second plurality of media assets available on the second service application corresponding to the second service state, the fifth media asset corresponding to the one of the second plurality of media assets available on the second service application corresponding to the second service state; and generate the fifth media asset based on the first media asset and on the third media asset;

generate the sixth media asset based on the second media asset and on the fourth media asset; and replace the first media asset with the fifth media asset and the second media asset with the sixth media asset.

16. The system of claim 15 wherein the control circuitry is further configured, when generating the sixth media asset based on the fourth media asset, to:

retrieve a name corresponding to the second service state; and generate the sixth media asset based on the name corresponding to the second service state and the fourth media asset.

17. The system of claim 11 wherein the control circuitry is further configured, when generating the fifth media asset based on the third media asset, to:

generate the fifth media asset based on the first media asset and the third media asset.

18. The system of claim 11 wherein the control circuitry is further configured, when generating the fifth media asset based on the third media asset, to:

determine, for the first service application, another of a first plurality of media assets available on the first service application corresponding to the service state of the first service application;

determine, for the another of the first plurality of media assets available on the first service application corresponding to the service state of the first service application, a seventh media asset corresponding to the another of the first plurality of media assets available on the first service application corresponding to the service state of the first service application; and generate the fifth media asset based on the third media asset and the seventh media asset.

19. The system of claim 11 wherein the control circuitry is further configured, when generating the fifth media asset based on the third media asset, to:

retrieve a name corresponding to the service state of the first service application; and generate the fifth media asset based on the name corresponding to the service state of the first service application and the third media asset.

20. The system of claim 11 wherein the control circuitry is further configured, when generating the fifth media asset based on the third media asset, to:

retrieve a first name corresponding to the one of the first plurality of media assets; and generate the fifth media asset based on the first name corresponding to the one of the first plurality of media assets and the third media asset.

* * * * *